(12) United States Patent  
Cahill

(10) Patent No.: US 8,814,587 B2
(45) Date of Patent: Aug. 26, 2014

(54) LOW IMPEDANCE EQUIPMENT INTERFACE

(71) Applicant: Goodrich Corporation, Charlotte, NC (US)

(72) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 10 days.

(21) Appl. No.: 13/686,200

(22) Filed: Nov. 27, 2012

(65) Prior Publication Data

US 2014/0148038 A1 May 29, 2014

(51) Int. Cl.
| | |
|---|---|
| *H01R 13/00* | (2006.01) |
| *G01D 11/30* | (2006.01) |
| *B60T 8/32* | (2006.01) |
| *B60C 23/04* | (2006.01) |
| *B64C 25/36* | (2006.01) |

(52) U.S. Cl.
CPC .............. *H01R 13/00* (2013.01); *G01D 11/30* (2013.01); *B60T 8/329* (2013.01); *B60C 23/04* (2013.01); *B64C 25/36* (2013.01)
USPC ......................................... 439/350

(58) Field of Classification Search
USPC ............................ 439/350, 512, 66, 774, 825
See application file for complete search history.

(56) References Cited

U.S. PATENT DOCUMENTS

| | | | | |
|---|---|---|---|---|
| 3,065,450 | A * | 11/1962 | Fieberg ........................ | 439/825 |
| 3,488,997 | A * | 1/1970 | Kliever ........................ | 73/65.06 |
| 4,061,413 | A * | 12/1977 | Keller ........................ | 439/524 |
| 4,805,943 | A * | 2/1989 | Balsells ........................ | 285/318 |
| 5,082,390 | A * | 1/1992 | Balsells ........................ | 403/326 |
| 5,482,480 | A * | 1/1996 | Miyazaki ...................... | 439/774 |
| 5,575,694 | A * | 11/1996 | Hawkins et al. .............. | 439/825 |
| 6,146,166 | A * | 11/2000 | Muzslay ........................ | 439/176 |
| 6,608,251 | B1 * | 8/2003 | Nurmi ............................ | 174/367 |
| 7,435,102 | B2 * | 10/2008 | Goodman ........................ | 439/70 |
| 7,482,546 | B2 * | 1/2009 | Sellner et al. .................. | 200/293 |
| 7,566,031 | B2 * | 7/2009 | Airoldi et al. ............. | 244/100 R |
| 7,601,006 | B2 * | 10/2009 | Christoffersen ................ | 439/32 |
| 7,991,531 | B2 * | 8/2011 | Gowan et al. .................. | 701/71 |
| 8,078,280 | B2 * | 12/2011 | Sage ............................... | 607/37 |
| 8,398,029 | B2 * | 3/2013 | Leroy et al. ................. | 244/137.1 |
| 8,449,327 | B2 * | 5/2013 | Low et al. ..................... | 439/579 |

* cited by examiner

*Primary Examiner* — Alexander Gilman
(74) *Attorney, Agent, or Firm* — Kinney & Lange, P.A.

(57) ABSTRACT

An assembly mounted to a surface, the assembly includes a component; and a plurality of fingers connected to the component and in contact with the surface to provide a low impedance path between the component and the surface.

17 Claims, 3 Drawing Sheets

LOW IMPEDANCE EQUIPMENT INTERFACE

BACKGROUND

The present invention is related to aircraft equipment interfaces, and in particular to providing a low impedance interface for aircraft components.

Regulations require electrical resistances on the external of an aircraft remain below very low levels. During flight, aircraft are susceptible to lightning strikes. These strikes often occur, for example, by hitting the nose of the aircraft and exiting through the wing or the landing gear. Because of this, components located on the outer portions of the aircraft must have low resistances. If the resistances are not low enough to create one consistent low impedance path, charges can build up across gaps and create destructive arcing.

Traditionally, components such as sensors on the external of the aircraft were held in place by screws. This creates a single electrical connection between the unit and the body to which the unit is mounted. Because of this, the unit interface was usually coated to provide lower impedance. However, these coatings degrade over time, which causes the impedance of the interface to increase, creating a greater chance for arcing to occur. It is desirable to create an interface that provides a low impedance path between a component and a body without the necessity for coatings.

SUMMARY

An assembly mounted to a surface includes a component and a plurality of fingers. The plurality of fingers are connected to the component and in contact with the surface to provide a low impedance path between the component and the surface.

DETAILED DESCRIPTION

The present invention describes a system for providing a low impedance interface for aircraft components. In one embodiment, the low impedance interface is implemented for a sensor unit located within an axle of the landing gear of an aircraft. In other embodiments, the low impedance interface may be included for any interface between a component or piece of equipment and any other surface for which low impedance is desirable. The interface includes a plurality of spring-loaded fingers mechanically connected to an outer portion of the component. These fingers radially extend from the component to an inner surface of a body that substantially surrounds the component such as, for example, an axle of an aircraft landing gear. The fingers create a parallel electrical connection with the body to greatly reduce the overall impedance between the component and the body. The spring-loaded fingers may provide an interference fit to hold the component in place, or may be mechanically connected to the body by, for example, welding.

Figure 1:
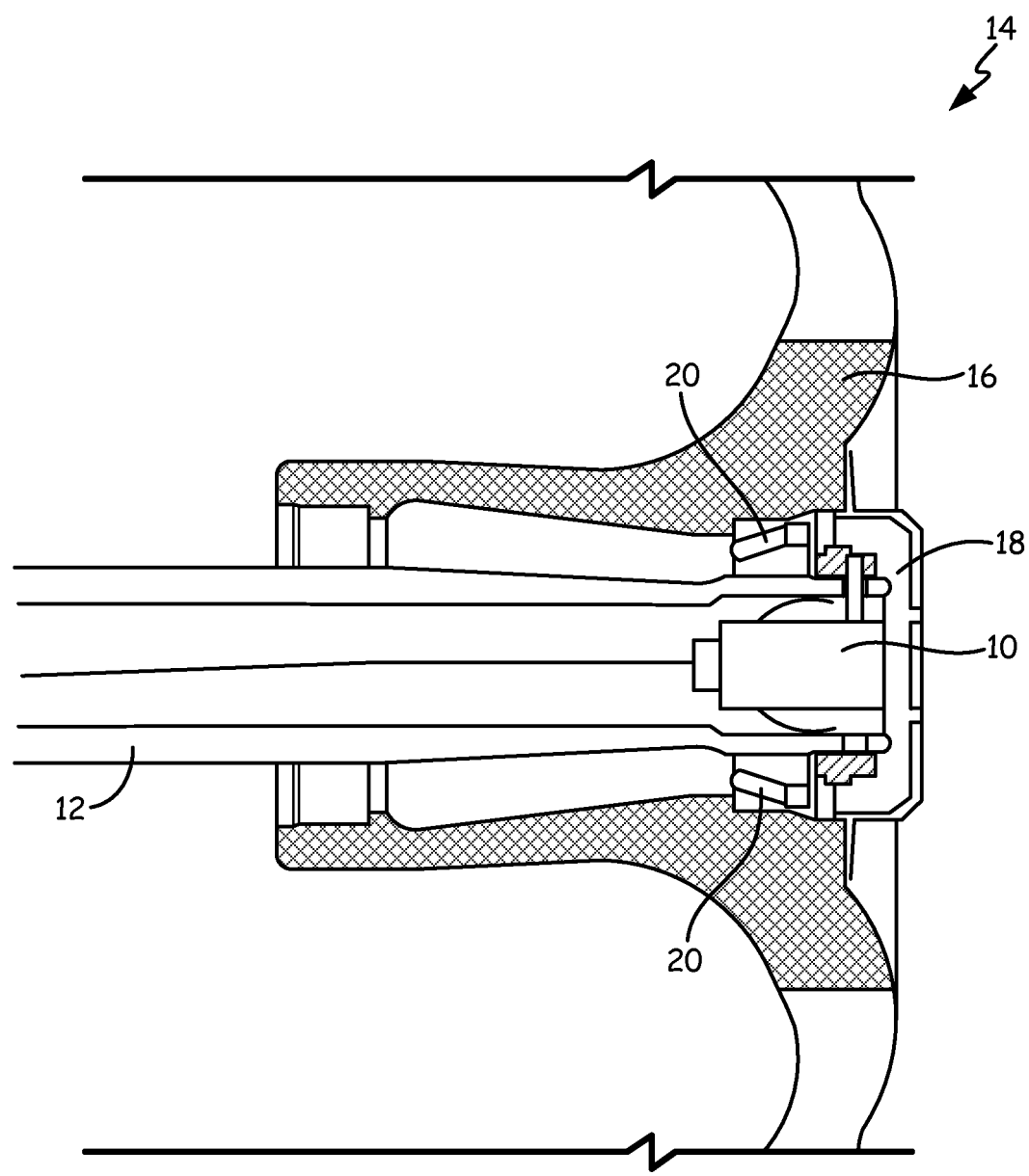
FIG. 1 is a cross-sectional view that illustrates a location of a component that includes a low impedance interface within an aircraft landing gear.

FIG. 1 is a cross-sectional view that illustrates component 10 which includes a low impedance interface with body 12. In the present embodiment, component 10 is illustrated as a sensor unit and body 12 is illustrated as an axle of an aircraft landing gear 14. In other embodiments, component 10 can be any equipment or component, and body 12 can be any body that substantially surrounds component 10 for which a low impedance interface is desirable. Landing gear 14 includes wheel 16, hubcap assembly 18, and bearings 20. Body 12, in this case an axle of landing gear 14, remains stationary relative to wheel 16. Wheel 16 rotates about the axle on bearings 20. Hubcap assembly 18 rotates with wheel 16. Component 10 remains stationary with respect to body 12 and measures, for example, rotational speed of wheel 16 and the air pressure of a tire of wheel 16.

Figure 2:
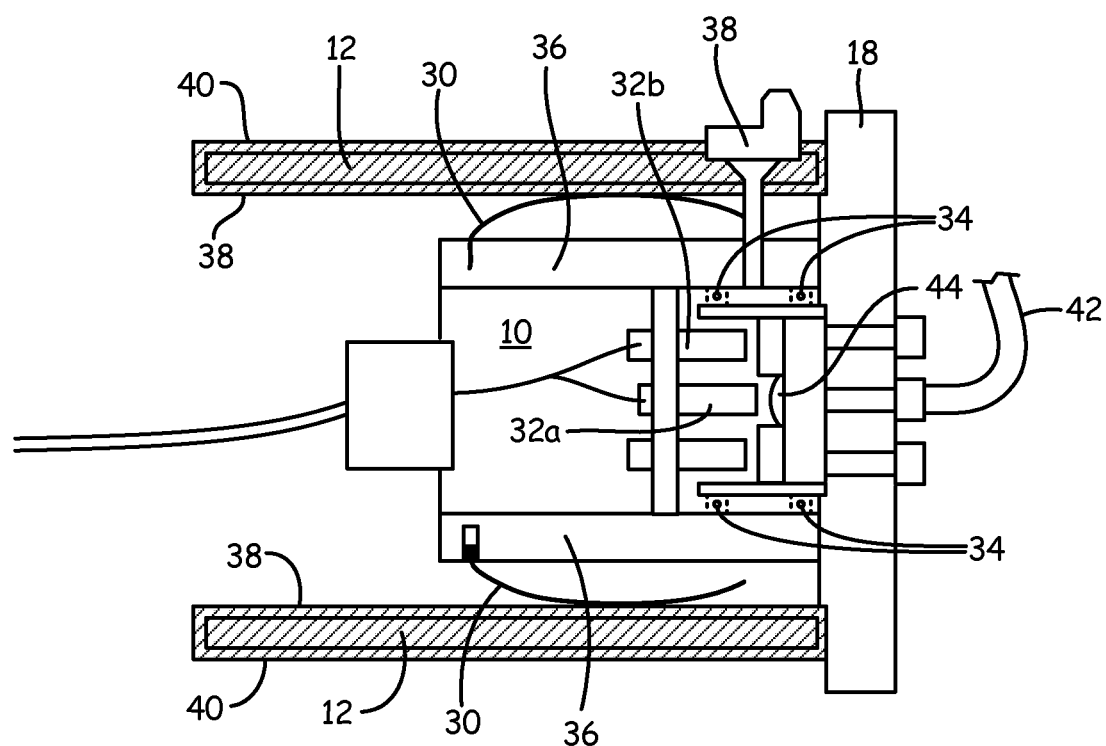
FIG. 2 schematically illustrates a component with a low impedance interface positioned within an axle.
Figure 3A:
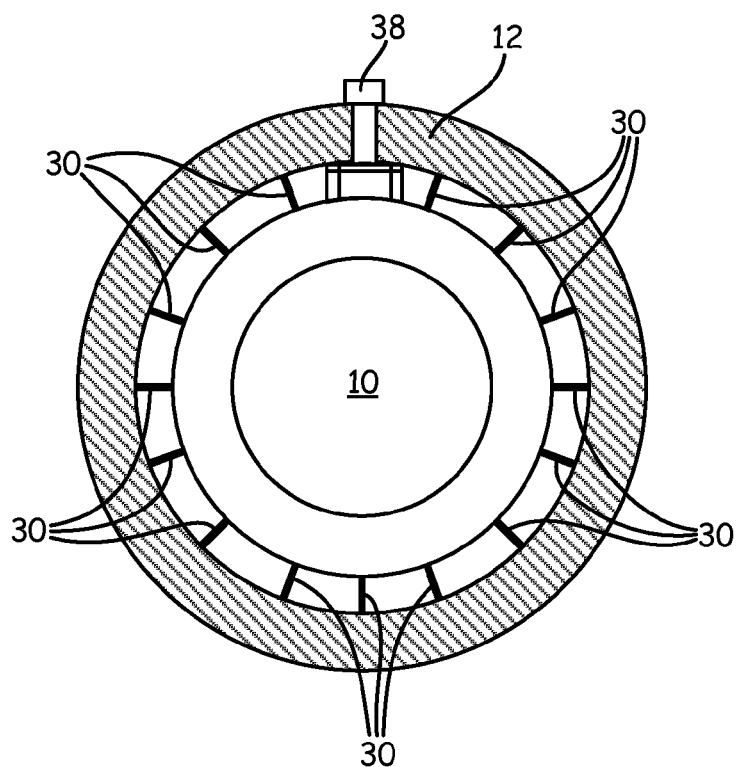
FIG. 3A schematically illustrates an axial view of a component with a low impedance interface.
Figure 3B:
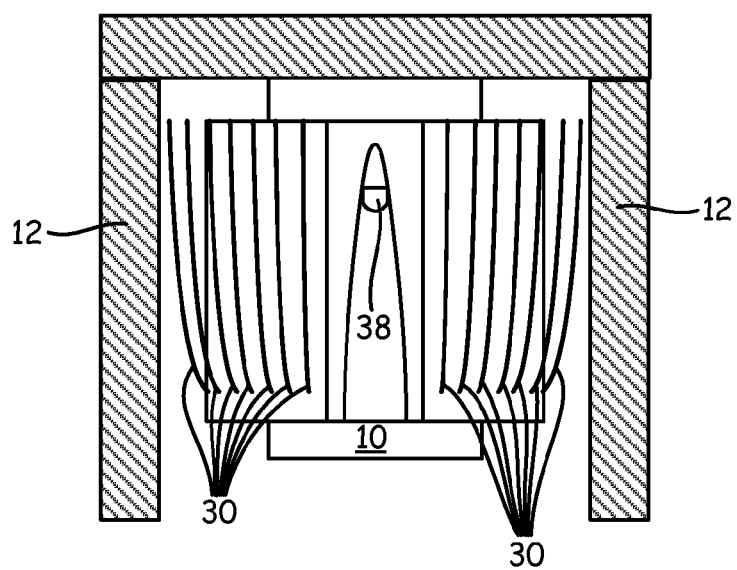
FIG. 3B schematically illustrates a top-down view of a component with a low impedance interface.

FIG. 2 schematically illustrates a cross-sectional view of component 10 positioned within body 12, FIG. 3A schematically illustrates an axial view of component 10 positioned within a body 12, and FIG. 3B is a partial sectional view that schematically illustrates a top view of component 10 positioned within a body 12.

In the present embodiment, component 10 is a sensor unit and includes fingers 30, sensors 32a and 32b, bearings 34, and housing 36. Body 12 includes inner surface 38 and outer surface 40. Fingers 30 may be spring loaded and mechanically connected to housing 36. Any number of fingers may be implemented circumferentially around housing 36. Spring-loaded fingers 30 may provide an interference fit with inner wall 38 to hold component 10 in place within body 12. An anti-rotation screw 38 may also be used to keep component 10 from rotating relative to body 12. Although illustrated as a sensor unit with two sensors 32a and 32b, component 10 may be any component or other piece of equipment for which it is desirable to mount to a body 12 using a low impedance interface.

Fingers 30 may all be made from the same material, or may be made from a plurality of materials. For example, some fingers may be made for good bonding, some for better spring characteristics (holding force) and some for long term corrosion protection. Fingers 30 provide parallel electrical connections between inner wall 38 and component 10. This provides a low impedance path between component 10 and body 12. Aircraft standards may require the impedance be no greater than, for example, 2.5 milliohms so that no destructive arcing occurs in any gap located at, or around component 10. By using fingers 30, the path between body 12 and component 10 can be kept below 2.5 milliohms using many different materials such as, for example, stainless steel. Fingers 30 may be made from any material that keeps the impedance of component 10 below the desired levels. Fingers 30 may each be of any width, length, or thickness such that fingers 30 provide a low impedance path between component 10 and body 12.

Sensors 32a and 32b are utilized, for example, to measure the rotational speed of wheel 16 and the inflated pressure of a tire mounted on wheel 16. Hubcap assembly 18 rotates on bearings 34 with wheel 16. Tire pressure may be sensed by sensor 32a using, for example, non-contact displacement sensing. The tire's pressure is delivered to hubcap assembly 18 through pressure tubing 42. The pressure causes a deflection of a pressure vessel 44. As the tire pressure changes, the height of pressure vessel 44 changes. Sensor 32a measures the height of pressure vessel 44 and uses this height to calculate the present tire pressure.

Rotational speed of wheel 16 may be sensed by sensor 32b using, for example, a changing surface contour 44 of hubcap assembly 18. Sensor 32b is stationary with respect to hubcap assembly 18 and measure the distance to hubcap 18. Contour 44 of hubcap assembly 18 changes circumferentially around hubcap assembly 18. Therefore, as hubcap 18 rotates about body 12, sensor 32b measures a different distance to hubcap assembly 18 and can determine the angular position of wheel 16 at any given time. Thus, the angular speed of wheel 16 can be determined using sensor 32b. Sensors 32a and 32b may also be used for any other known sensing applications for aircraft.

The following are non-exclusive descriptions of possible embodiments of the present invention.

An assembly mounted to a surface that includes, among other things: a component, and a plurality of fingers connected to the component and in contact with the surface to provide a low impedance path between the component and the surface.

The assembly of the preceding paragraph can optionally include, additionally and/or alternatively, any one or more of the following features, configurations and/or additional components.

The surface is an inner surface of a body that substantially surrounds the component.

The body is a cylinder.

The body is an axle of an aircraft landing gear.

The component is a sensor unit that measures properties of a wheel of the aircraft landing gear.

The plurality of fingers are circumferentially spaced around an outer surface of the component.

An impedance of the low impedance path is less than 2.5 milliohms.

A low impedance system that includes, among other things: a component that has a plurality of conductive fingers extending radially outward from the component, a body that substantially surrounds the component, wherein the fingers contact the body to provide a low impedance path between the body and the component.

The system of the preceding paragraph can optionally include, additionally and/or alternatively, any one or more of the following features, configurations and/or additional components.

The plurality of conductive fingers are spring-loaded and provide an interference fit with the body.

An impedance of the low impedance path is less than 2.5 milliohms.

The body is a cylinder.

The body is an axle of an aircraft landing gear.

The component is a sensor unit that measures properties of a wheel of the aircraft landing gear.

A low-impedance interface that connects a body and a component that includes, among other things: a plurality of conductive fingers that have a first end and a second end, each first end is mechanically connected to an outer surface of the component, and each second end is electrically connected with an inner surface of the body to provide a low impedance path between the component and the body.

The interface of the preceding paragraph can optionally include, additionally and/or alternatively, any one or more of the following features, configurations and/or additional components.

An impedance of low impedance path is less than 2.5 milliohms.

The body substantially surrounds the component.

The body is a cylinder.

The body is an axle of an aircraft landing gear.

The plurality of fingers are circumferentially spaced around the outer surface of the component.

The component is a sensor unit that measures properties of a wheel of a landing gear.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment(s) disclosed, but that the invention will include all embodiments falling within the scope of the appended claims.

The invention claimed is:

1. An assembly mounted to a surface, the assembly comprising:
   a component that includes a housing; and
   a plurality of fingers connected to the housing and in contact with the surface to provide a low impedance path between the component and the surface, wherein the plurality of fingers are circumferentially spaced around the housing, wherein the surface is an inner surface of a body that substantially surrounds the component, wherein the body is an axle of an aircraft landing gear.

2. The assembly of claim 1, wherein the body is a cylinder.

3. The assembly of claim 1, wherein the component is a sensor unit that measures properties of a wheel of the aircraft landing gear.

4. The assembly of claim 1, wherein an impedance of the low impedance path is less than 2.5 milliohms.

5. The assembly of claim 1, wherein at least a first one of the plurality of fingers comprises a first material, and wherein at least a second one of the plurality of fingers comprises a second material different from the first material.

6. The assembly of claim 1, wherein the first material is selected for one of good bonding, better spring characteristics, and corrosion protection, and wherein the second material is selected for one of good bonding, better spring characteristics, and corrosion protection different from the first material.

7. A low impedance system comprising:
   a component having a plurality of conductive fingers extending radially outward from the component; and
   an axle of an aircraft landing gear substantially surrounding the component, wherein the fingers contact the axle of the aircraft landing gear to provide a low impedance path between the axle of the aircraft landing gear and the component.

8. The system of claim 7, wherein the plurality of conductive fingers are spring-loaded and provide an interference fit with the axle of the aircraft landing gear.

9. The system of claim 7, wherein an impedance of the low impedance path is less than 2.5 milliohms.

10. The system of claim 7, wherein the axle of the aircraft landing gear is a cylinder.

11. The system of claim 7, wherein the component is a sensor unit that measures properties of a wheel of the aircraft landing gear.

12. A low-impedance interface that connects a body and a sensor unit, the low-impedance interface comprising:
    a plurality of conductive fingers having a first end and a second end, each first end mechanically connected to an outer surface of the sensor unit, and each second end electrically connected with an inner surface of the body to provide a low impedance path between the component and body, wherein the sensor unit measures properties of a wheel of a landing gear.

13. The interface of claim 12, wherein an impedance of low impedance path is less than 2.5 milliohms.

14. The interface of claim 12, wherein the body substantially surrounds the sensor unit.

15. The interface of claim 14, wherein the body is a cylinder.

16. The interface of claim 15, wherein the body is an axle of an aircraft landing gear.

17. The interface of claim 15, wherein the plurality of fingers are circumferentially spaced around the outer surface of the sensor unit.

* * * * *